Aug. 25, 1964     J. SEREMAK     3,146,338
ELECTRIC OVEN

Filed Jan. 2, 1962     2 Sheets-Sheet 1

INVENTOR.
JEROME SEREMAK
BY
Marvin M. Chaban

ATTORNEY

Aug. 25, 1964
J. SEREMAK
3,146,338
ELECTRIC OVEN
Filed Jan. 2, 1962
2 Sheets-Sheet 2
FIG. 3
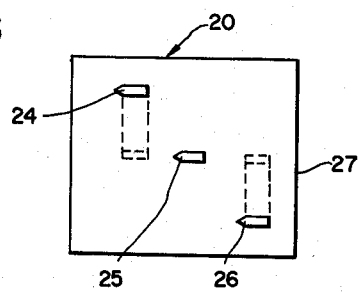
FIG. 4
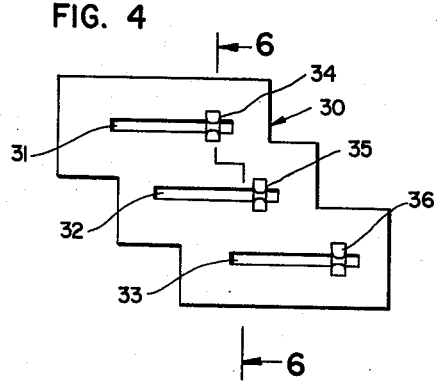
FIG. 5
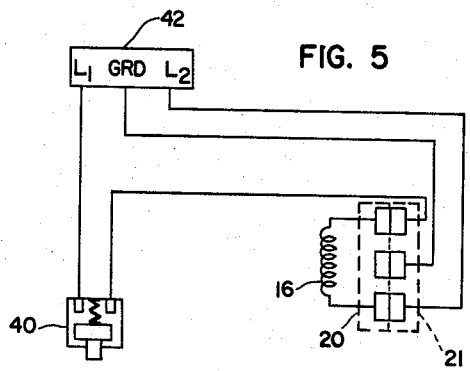
FIG. 6
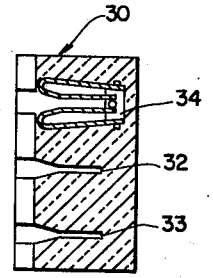
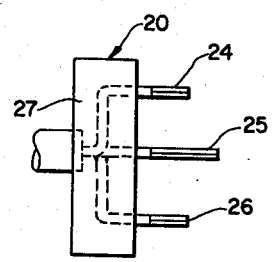
FIG. 7
INVENTOR.
JEROME SEREMAK
BY
*Marvin M. Chaban*
ATTORNEY

United States Patent Office

3,146,338
Patented Aug. 25, 1964

3,146,338
ELECTRIC OVEN
Jerome Seremak, Chicago, Ill., assignor to General Electric Company, a corporation of New York
Filed Jan. 2, 1962, Ser. No. 163,698
3 Claims. (Cl. 219—403)

This invention relates to an electric oven, and more particularly to a combined oven door and oven control circuit.

In many circumstances, it is desirable to have an oven deck or shelf which will move or swing out of the oven compartment to provide a convenient loading space for insertion of food into the oven and for inspection of food during and after baking. Further, the use of a swing-out shelf facilitates the job of cleaning the shelf since the shelf is readily convenient for cleaning when withdrawn from the oven. With the movable oven deck, it becomes expedient in producing the most efficient transfer of heat to the shelf to mount the heating element in thermally conductive relationship to the shelf. This mounting arrangement is implemented by physically affixing the heating element to the underside of the oven deck so that the heating element is in direct contact with the oven deck and movable jointly with the deck. This form of mounting protects the food in the oven from direct contact with the heating element and also protects the heating element from spillage and from contact with carelessly handled cooking utensils. This form of heating element mounting presents a problem, however, in that cable means providing electrical power to the heating element during baking operations must either be of sufficient length and flexibility to allow sufficient movement of the heating element or be disconnected from the heating element. The first alternative results in excessive wear of the electrical conductor cable by kinking and bending of the conductor insulator and is bulky and cumbersome. The second alternative, i.e., disconnecting the heating element, could result in electrical shock to the operator or could cause arcing upon disconnection which in turn could ignite cooking greases near the connecting means.

It is an object of this invention to provide an improved electric oven or range having a movable directly heated oven deck and circuit protection therefor.

A further object of this invention is to provide an improved, circuit protected oven having a swing-out deck of the type in which the deck carries with it an electric heating element.

A further object of this invention is to provide, in an electric oven, a movable deck and heating element together with control circuit means to prevent electrical shock or arcing when the heating element is disconnected from its power source during movement of the deck out of the oven.

Briefly stated, in accordance with one aspect of the invention, an electric oven is provided with an access opening and a movable closure member therefor. A horizontal deck member may be mounted to be movable with the closure member for movement within the oven in a horizontal plane as the closure member is moved. A heating element is carried by the deck member and is provided with terminals adapted to removably connect with electric circuit connecting means positioned within the oven as the deck is moved into the oven. Switching means are provided in series electrical circuit with the connecting means and control the application of electrical power to the connecting means and the heating element. The switching means is positioned to be engaged and closed by said closure member only when the closure member is so far closed as to prevent movement of the deck from within the oven. Thus the heating element terminals are engaged with the connecting means, while the closure member is closed. When the closure member is opened sufficiently to permit movement of the deck, the normally open switch is open circuited, so that arcing across the terminal and connecting means is prevented when the deck is moved to disconnect its terminal and connecting means.

While the specification concludes with claims particularly pointing out and distinctly claiming the subject matter which is regarded as the invention, it is believed that the invention will be better understood from the following description taken in connection with the accompanying drawings, in which:

FIG. 3 is a view of the heating element terminals taken along the line 3—3 of FIG. 2;

FIG. 4 is a view of the connecting means taken along the line 4—4 of FIG. 2;

FIG. 5 is a schematic representation of the electrical circuitry of the invention;

FIG. 6 is a detail sectional view of the connecting means of FIG. 4 viewed at lines 6—6 of FIG. 4; and FIG. 7 is a left side view of the heating element terminal structure of FIG. 3.

Figure 1:
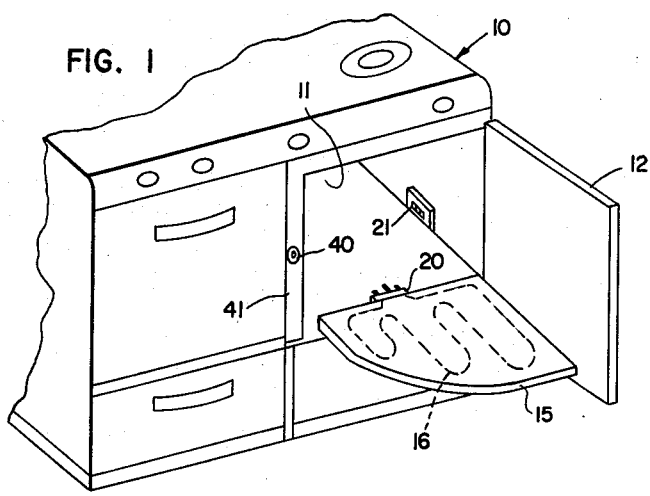
FIG. 1 is a perspective view of an electric range embodying the invention, with the door and deck illustrated in their swung-out position.
Figure 2:
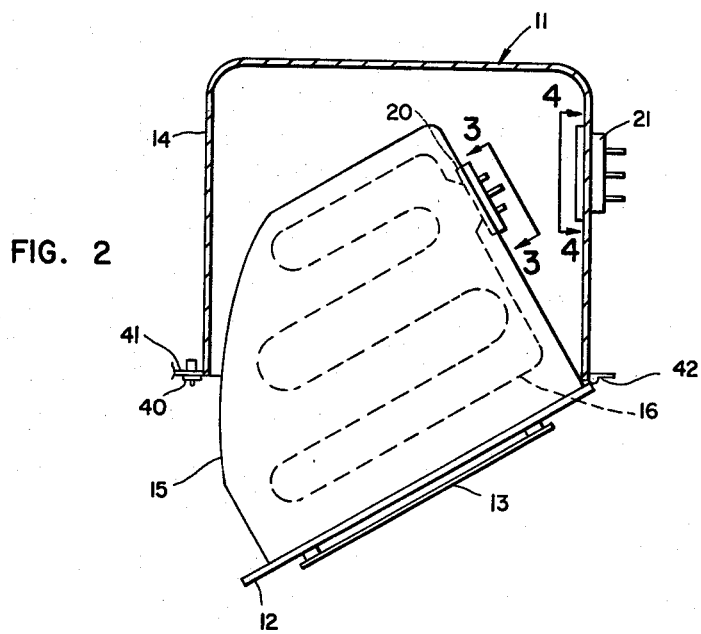
FIG. 2 is a horizontal sectional view through the oven compartment of the range shown in FIG. 1 with the door partially open.

Referring to the drawings, and in particular FIGS. 1 and 2, an electric range 10 is shown having an oven compartment 11. The access opening for the oven compartment 11 is provided with a door 12 which may be vertically hinged for movement in a horizontal plane. The door 12 is provided with a handle 13 to facilitate the opening and closing thereof. The oven compartment 11 is defined by a box-like liner 14.

A movable oven deck 15 is positioned near the bottom of the inner surface of the door 12. The deck 15 lies in a horizontal plane slightly above the lower extremity of the oven compartment access opening so as to be free for swinging movement in the horizontal plane in which it lies. Secured to the under surface of the deck 15 is an electrical resistance heating element 16 which provides the necessary heat for the baking operations which take place within the oven compartment. The deck 15 may be secured to the door 12 as shown or it may be independently mounted for movement into and out of the oven by any suitable means not shown.

The heating element 16 terminates in the form of electrical terminal structure or terminal means shown generally at 20. The particular details of the terminal structure will be hereinafter more fully discussed. An electrical connecting means indicated generally at 21, is mounted on one wall of the oven compartment 11. The connecting means is positioned to cooperate with the aforementioned terminal means 20 as will be hereinafter more fully discussed.

The aforementioned terminal structure 20 is provided with three individual male terminals 24, 25 and 26 which are shown in more detail in FIGS. 3 and 7. The individual terminals 24, 25 and 26 are each comprised of an elongated blade of metal extending outwardly from an insulator 27. As shown in FIG. 3, one of the vertical edges of each terminal is tapered to facilitate the engagement of the terminal with the connecting means 21 as the deck 15 is moved. The terminal 25 represents the ground terminal and it should be noted that this terminal is slightly more elongated than the remaining terminals 24 and 26. With this arrangement, the ground terminal disengages the connecting means 21 after the two main terminals 24 and 26 have been disengaged during disconnection of the heating element and, on reengagement of the heating element, the ground terminal engages before the main power terminals.

The connecting means comprises an insulative housing 30 having three horizontally elongated slots 31, 32 and 33. Positioned within the insulative casing 30, in alignment with the aforementioned slots 31, 32 and 33, are female connecting means 34, 35 and 36 respectively. Each of these connecting means is adapted to slideably receive a terminal in a mutual electrically contacting arrangement.

It should be noted that the slots 31, 32 and 33 of the connecting means 21 individually lie in separate horizontal planes and, that the individual terminals 24, 25 and 26 of the terminal means 20 also each individually lie in a separate horizontal plane. This particular arrangement prevents any misconnections during engagement or disengagement of the heating element terminal with the connecting means.

A spring-operated normally-open switch 40 is mounted on a flange portion 41 of the oven compartment liner 14. Flange 41, it should be noted, is positioned at the side of the closure access opening most remote from the hinge 42 of door 12. By this remote positioning, switch 40 is responsive to the slightest movement of door 12 and will be opened by door movements of the stated magnitude. The switch 40 is so positioned on the flange 41 that the switch is closed by the oven door 12 as the oven door reaches its closed position. FIG. 5 illustrates the series circuit electrical connections between the switch 40, the heating element 16, and a conventional oven temperature control switch 42.

The operation of the device as thus far described, is as follows: With the oven door 12 in the closed position, the male terminals 24, 25 and 26 of the heating element terminal 20 are in engagement with the female connector elements 34, 35 and 36 respectively of the connecting means 21. Also, the normally open siwtch 40 is being held in closed position by the door 12 so that an electrical circuit through a conventional temperature control switch 42 and the heating element 16 is possible. As the operator opens the door 12 by pulling one the handle 13, the door rotates about the hinge 42 and, assuming the deck 15 is fastened to the door 12, after a very small degree of rotation, the switch 40 opens while the terminals 24, 25 and 26 are still in the process of withdrawing from the female connection means 34, 35 and 36. However, at the instant after the switch has opened, electrical contact through all of the terminals is still maintained between the terminals and the connecting means. As the door and the deck are further rotated, the main power terminals 24 and 26 separate from their cooperative connectors 34 and 36 prior to the separation of the ground terminal 25 from its cooperative connector 35 due to the shorter length of the main power terminals 24 and 26. Since the switch has been opened prior to the separation of the terminals from the connector means, there is no possibility of electrical shock to the operator or arcing during the separation, which arcing could result in ignition of cooking greases near the terminals or connecting means. Further, it is ensured that the deck is no longer being heated while the food is being inspected or maintained pending removal to the table for serving.

Upon closing of the door 12 and moving of the deck 15 into the oven, the above sequence of circuit closures is reversed. The ground terminal 25 engages its cooperative connector 35 prior to the engagement of the main power terminals 24 and 26 with their respective connectors 34 and 36. The power terminals 24 and 26 are engaged with their respective connectors 34 and 36 prior to the closing of the switch means 40. Finally, on the door 12 physically reaching switch means 40 at the door fully closed position, the circuit through door switch 40 is re-established to the heating means; this action occurring just prior to the door reaching its fully closed position.

As previously mentioned, it is not essential to the invention that the deck member 15 be secured to or carried by the door 12. It is possible to support the deck separately from the door so that the door 12 can be opened without the simultaneous movement of the deck. Inasmuch as the switch 40 will be operated by the slightest amount of opening of the door 12, it would be possible to subsequently swing out the deck member without attendant electrical shock or arcing. Since the normally open switch will open the circuit before the door is opened far enough to permit movement of the deck, electric arcing and hazards incident thereto are prevented when the deck is moved to disconnect its terminals and connecting means.

It should be noted that any suitable rail members or guards (not shown) may be employed about the curved periphery of deck member 15 to protect the user of the appliance from inadvertent physical contact with the heated deck member. Such guards would protect the user when the deck is withdrawn from the oven during baking for the purpose of inspecting the baking operation or for the purpose of removing the food at the conclusion of the operation.

Further, suitable latch means (not shown) may be employed to hold the door in the fully closed position maintaining switch 40 closed. Such latch means would, of course, release automatically on grasping of handle 13 followed by the exertion of outward pressure on the door. Suitable spring biasing latch members of any known type may be used for this function.

As will be evident from the foregoing description, certain aspects of the invention are not limited to the particular details of construction of example illustrated, and it is contemplated that various and other modifications or applications will occur to those skilled in the art. It is therefore intended that the appended claims shall cover such modifications and applications as do not depart from the true spirit and scope of the invention.

Having thus described the invention, what is claimed is:
1. An electric oven comprising,
  (a) an access opening for the oven,
  (b) a closure member for said access opening,
  (c) a deck member mounted within the oven for movement into and out of the oven,
  (d) an electric resistance heating element carried by said deck member,
  (e) electrical connecting means positioned within the oven,
  (f) said heating element having terminals adapted to removably engage said connecting means as said deck member is moved into the oven and to disengage said connecting means after the commencement of movement of said closure member to open position,
  (g) a normally open electrical switch means adapted to be closed by said closure member only upon movement of the closure member to the closed position and to open immediately upon movement of said closure member from the closed position, and
  (h) means connecting said switching means in series electrical circuit with said connecting means to control the application of electrical power to the connecting means, such that the series circuit is opened by the movement of said closure member from the closed position to permit movement of the deck member from within the oven to a position to disconnect said terminals and connecting means.
2. An electric oven comprising:
  (a) an access opening for the oven,
  (b) a horizontally swinging closure member for said access opening,
  (c) a horizontal cooking deck mounted on said closure member for swinging movement within the oven in a horizontal plane as said closure member is moved, (d) an electric resistance heating element carried by said cooking deck to heat the same for cooking operations to be performed thereon, (e) electrical connecting means positioned within the oven, (f) said heating element having terminals adapted to removably connect with said connecting means prior to the movement of said closure member to the closed position, (g) a normally open electrical switching means adapted to be engaged by said closure member to be operated to closed circuit condition only upon movement of the closure member to substantially the closed position, and (h) means connecting said switching means in series electrical circuit with said connecting means to control the application of electrical power to the connecting means and the heating element.

(i) said switching means being positioned to be engaged by said closure member only after engagement of the terminal means with the connecting means when said closure is moved to the closed position.

3. An electric heating and control circuit for a cooking appliance including structure providing a cooking cavity having a door provided with vertical hinge means whereby said door may be operated between open and closed positions, said structure further including means providing a horizontally disposed cooking deck movable in a horizontal plane into or out of an operative position within said cooking cavity as the door is moved into closed or open position, comprising:

an electrical resistance heating element adapted to be carried by said deck to heat the same to desired cooking temperature, said heating element having male terminal portions extending horizontally from an edge of said deck, structure providing female electric terminal means adapted to be carried by said cooking cavity structure for cooperative engagement by said heating element terminals upon movement of said deck to operative position within said cavity, an electric energy circuit including a temperature control switch for energizing said heating element, switch means operatively associated with said door and arranged to effect completion or interruption of said energy circuit according to whether said door is in closed or open position, and means whereby the movement of said door to a substantially completely closed position will effect operation of said switch means at least to prepare said energy circuit for completion, the disposition of said male and female terminal elements being such that they will be in electrical connection prior to the operation of said switch means to effect completion of said energy circuit and will disengage for disconnection of said heating element from said energy circuit only after said door has been opened sufficiently to actuate said switch to effect the disconnection of said heating element from said energy circuit.

References Cited in the file of this patent
UNITED STATES PATENTS

| | | |
|---|---|---|
| 996,454 | Carpenter | June 27, 1911 |
| 1,632,719 | White | June 14, 1927 |
| 2,447,184 | Jones | Aug. 17, 1948 |
| 2,535,379 | White | Dec. 26, 1950 |
| 2,702,848 | Scofield et al. | Feb. 22, 1955 |
| 2,761,053 | Schneider | Aug. 28, 1956 |